(12) United States Patent
Akeda et al.

(10) Patent No.: US 8,998,183 B2
(45) Date of Patent: Apr. 7, 2015

(54) SUSPENSION APPARATUS

(75) Inventors: Mamoru Akeda, Yokohama (JP);
Nobuhiro Shibuya, Yokohama (JP);
Mitsuru Enomoto, Hino (JP)

(73) Assignee: NHK Spring Co., Ltd., Yokohama (JP)

( * ) Notice: Subject to any disclaimer, the term of this patent is extended or adjusted under 35 U.S.C. 154(b) by 166 days.

(21) Appl. No.: 13/262,346

(22) PCT Filed: Mar. 19, 2010

(86) PCT No.: PCT/JP2010/054787
§ 371 (c)(1),
(2), (4) Date: Nov. 4, 2011

(87) PCT Pub. No.: WO2010/116882
PCT Pub. Date: Oct. 14, 2010

(65) Prior Publication Data
US 2012/0043707 A1    Feb. 23, 2012

(30) Foreign Application Priority Data
Apr. 9, 2009    (JP) .................................. 2009-095189

(51) Int. Cl.
*B60G 11/04* (2006.01)
*B60G 11/10* (2006.01)
*B60G 11/12* (2006.01)

(52) U.S. Cl.
CPC .............. *B60G 11/10* (2013.01); *B60G 11/04* (2013.01); *B60G 11/12* (2013.01); *B60G 2200/30* (2013.01); *B60G 2202/112* (2013.01); *B60G 2204/121* (2013.01); *B60G 2204/45* (2013.01)

(58) Field of Classification Search
USPC ........................................ 267/51–52, 38, 36.1
See application file for complete search history.

(56) References Cited

U.S. PATENT DOCUMENTS

| | | | | |
|---|---|---|---|---|
| 1,598,648 | A | * | 9/1926 | Kerr ................................ 267/51 |
| 2,150,622 | A | * | 3/1939 | Hendrickson ................. 267/243 |
| 2,152,388 | A | | 3/1939 | Porter |
| 2,952,455 | A | | 9/1960 | Neuville et al. |
| 4,282,945 | A | * | 8/1981 | Bessey .......................... 180/345 |
| 4,872,653 | A | * | 10/1989 | Chuchua ....................... 267/271 |
| 6,062,549 | A | * | 5/2000 | Lamberti ......................... 267/48 |

FOREIGN PATENT DOCUMENTS

| | | |
|---|---|---|
| GB | 1 202 482 | 8/1970 |
| JP | U-57-118913 | 7/1982 |
| JP | Y2-61-44884 | 12/1986 |
| JP | U-2-136703 | 11/1990 |
| JP | A-6-173986 | 6/1994 |
| JP | B2-2776469 | 5/1998 |
| JP | A-2005-75017 | 3/2005 |

OTHER PUBLICATIONS

International Search Report issued in International Application No. PCT/JP2010/054787 on Apr. 27, 2010 (with translation).

* cited by examiner

Primary Examiner — Anna Momper
(74) Attorney, Agent, or Firm — Oliff PLC

(57) ABSTRACT

A suspension apparatus 100 includes a leaf spring 110 in which a front end and a rear end are rotatably supported by a frame 2 of a car and an intermediate portion thereof in a longitudinal direction is attached to an axle 3; and a stay 160 having an engaging portion 161 for blocking rotation of a portion to a rear of a breaking point of the leaf spring 110 when the leaf spring 110 is broken at a portion to a rear of the intermediate portion thereof.

9 Claims, 5 Drawing Sheets

SUSPENSION APPARATUS

BACKGROUND OF THE INVENTION

1. Field of the Invention

The present invention relates to a suspension apparatus.

2. Related Art

A leaf spring is used in suspension apparatuses in automobiles and is particularly used for those of large automobiles. Each front end and rear end of the leaf spring is rotatably supported by the frame of a car, and the intermediate portion in a longitudinal direction is connected to an axle. In suspension apparatuses using the leaf spring having this structure, a means for ensuring safety in a case in which the leaf spring is broken has been proposed in anticipation of such a situation (for example, see Japanese Patent Application, First Publication No. 6473986).

In a suspension apparatus disclosed in the gazette, a round portion in side view (hereinafter referred as an "eye") is formed at the front end of the leaf spring. One end of a belt-like member made of a thin plate such as a stainless steel plate is engaged to a bush inserted into the eye, and another end thereof is fixed to a portion in the vicinity of an axle. Therefore, when a portion of the leaf spring is broken between the eye formed at the front side and the portion in the vicinity of the axle, rearward movement of the portion fixed to the axle is avoided by the belt-like member, so that direct advance of the car can be maintained.

SUMMARY OF THE INVENTION

However, in a suspension apparatus having a structure as disclosed in the gazette, when the leaf spring is broken at a portion to a rear of the intermediate portion thereof while the car is moving, a portion to a rear of the breaking point of the leaf spring rotates around a portion rotatably supporting the portion to the rear of the breaking point, so that the portion to the rear of the breaking point contacts the ground. Therefore, the car is partially lifted by the portion to the rear of the breaking point of the leaf spring and a wheel moves away from the ground.

When the suspension apparatus is provided to a front wheel side of the car and if a front wheel moves away from the ground, since a steering apparatus and a braking apparatus are attached to the front wheel, the car may be uncontrollable and the brake may not function. On the other hand, when the suspension apparatus is provided to a rear wheel side of the car and if a rear wheel moves away from the ground, the brake may not function or drive force may not be transmitted to the ground.

The present invention has been made for solving problems of conventional techniques described above, and an object of the present invention is to provide a suspension apparatus in which safety is improved by preventing a wheel from moving away from the ground in a case of breakage of a leaf spring at a portion to a rear of an intermediate portion.

According to a first aspect of the present invention, a suspension apparatus includes: a leaf spring in which a front end and a rear end are rotatably supported by the frame of a car and an intermediate portion in a longitudinal direction is attached to an attaching member for a wheel; and a blocking means for blocking rotation of a portion to a rear of a breaking point of the leaf spring in a case of the breakage of the leaf spring at a portion to a rear of the intermediate portion.

According to the first aspect of the present invention, when the leaf spring is broken at the portion to the rear of the intermediate portion, the portion to the rear of the breaking point is prevented from contacting the ground by blocking rotation of the portion to the rear of the breaking point. Therefore, the car is not partially lifted, so that the wheel can be prevented from moving away from the ground. Therefore, safety of the car 1 can be improved.

According to a second aspect of the present invention, in accordance with the first aspect, the blocking means is a stay for supporting the portion to the rear of the breaking point of the leaf spring in a case of the breakage of the leaf spring at the portion to the rear of the intermediate portion.

According to the second aspect of the present invention, when the leaf spring is broken at the portion to the rear of the intermediate portion, the portion to the rear of breaking point of the leaf spring is prevented from contacting the ground since rotation of the portion to the rear of the breaking point of the leaf spring is blocked by supporting the portion to the rear of the breaking point by the stay. Therefore, the car is not partially lifted, so that the wheels can be prevented from moving away from the ground. Therefore, safety of the car can be improved.

According to a third aspect of the present invention, in the first aspect or the second aspect, the suspension apparatus includes: an eye formed at a rear end of the leaf spring; and a pin to which the eye is wrapped around is hanged in an inclinable condition; in which the blocking means is provided with an engaging member fixed to the eye and a stopping member fixed to the pin and the stopping member stops the engaging member moved by rotation of the eye in the case of breakage of the leaf spring at a portion to a rear of the intermediate portion.

According to the third aspect of the present invention, when the leaf spring is broken at the portion to the rear of the intermediate portion, the stopping member stops the engaging member and rotation of the portion to the rear of the breaking point is blocked, so that the portion to the rear of the breaking point is prevented from contacting the ground. Therefore, the car is not partially lifted, so that the wheel can be prevented from moving away from the ground. Therefore, safety of the car can be improved According to a fourth aspect of the present invention, in accordance with the second aspect, the suspension apparatus includes: a shackle rotatably supported by the frame and rotatably supporting the rear end of the leaf spring; and a stopper for blocking tilting of the shackle in an angle greater than a predetermined angle toward the front side of the car.

According to the fourth aspect of the present invention, the portion to the rear of the breaking point of the leaf spring can be prevented from contacting the ground by preventing the supporting condition by the stay of the portion to the rear of the breaking point from being canceled.

According to a fifth aspect of the present invention, the suspension apparatus includes: a shackle rotatably supported by the frame and rotatably supporting the rear end of the leaf spring; and a stopper for blocking tilting of the shackle toward the portion to the rear of the car at an angle greater than a predetermined angle.

According to the fifth aspect of the present invention, the shackle does not tilt rearward at the angle greater than the predetermined angle caused by a weight of the leaf spring in a condition in which the portion to the rear of the breaking point of the leaf spring is blocked to rotate by the engaging member and the stopping member, so that the portion to the rear of the breaking point is prevented from contacting the ground.

The present invention can provide a suspension apparatus in which safety is improved by preventing the wheel from moving away from the ground in a case of breakage of the leaf spring at the portion to the rear of the intermediate portion.

DESCRIPTION OF THE PREFERRED EMBODIMENTS

1. First Embodiment

Figure 1:
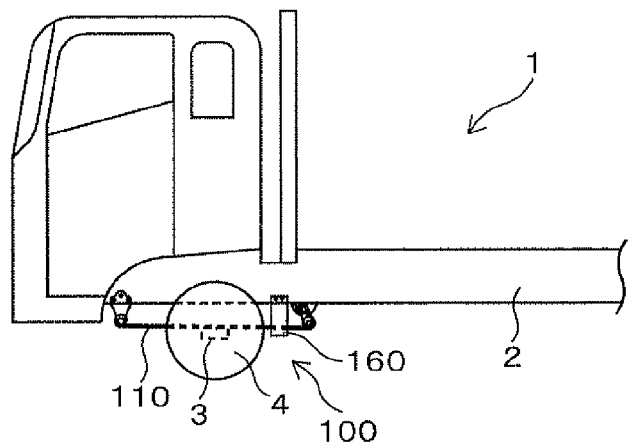
FIG. 1 is a side view showing a car equipped with a suspension apparatus.
Figure 2:
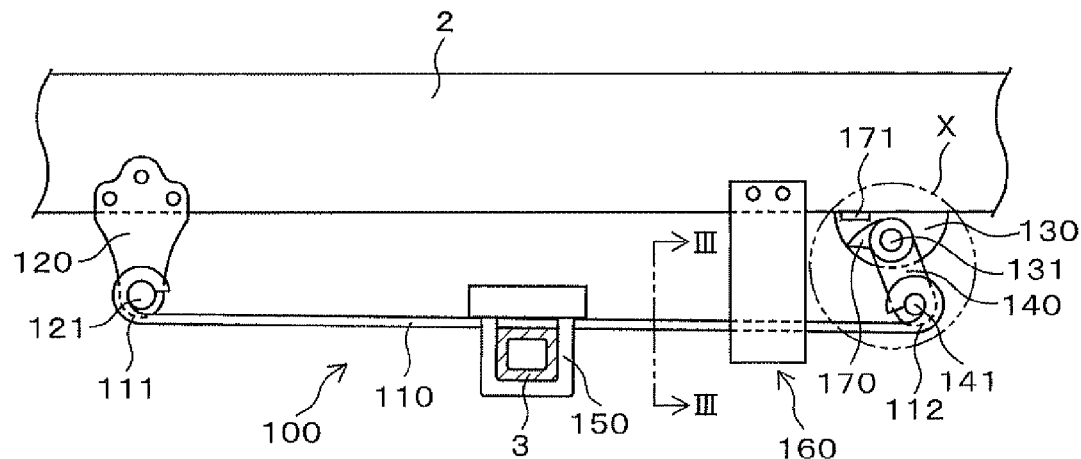
FIG. 2 is a view showing a schematic structure of the suspension apparatus.

An embodiment of the present invention is explained with reference to FIGS. 1 to 5 hereinafter. FIG. 1 is a side view showing a car 1 equipped with a suspension apparatus 100 of the present embodiment and FIG. 2 is a view showing a schematic structure of the suspension apparatus 100. The forward (the left hand in FIG. 1, FIG. 2 and FIG. 5) of the car 1 is a front side and the rearward thereof (the right hand in FIG. 1, FIG. 2 and FIG. 5) is a rear side.

As shown in FIG. 1, the car 1 is equipped with the suspension apparatus 100 for preventing the car 1 from extreme swinging and inclining from side to side, up and down, or back and forth. The suspension apparatus 100 is provided with a leaf spring 110 which is supported along the front-back direction and the frame of the car 1 at the under side of a frame 2. As shown in FIG. 2, the front end of the leaf spring 110 is upwardly curled, whereby an eye 111 having a cylindrical shape is formed. The rear end of the leaf spring 110 is also upwardly curled similarly to the front end, whereby an eye 112 having a cylindrical shape is formed. The leaf spring 110 is supported in a condition in which the front end and the rear end thereof are rotatably supported.

In the frame 2 of the car 1, a front bracket 120 is attached to a portion in the vicinity of the front end of the leaf spring 110. The front bracket 120 is provided with a pin 121. The eye 111 of the leaf spring 110 is wrapped around the pin in a tiltable condition via a bush (not shown). By this structure, the leaf spring 110 is rotatably supported by the frame 2 via the front bracket 120.

A rear bracket 130 is attached to a portion of the frame 2 of the car 1 in the vicinity of the rear end of the leaf spring 110. The rear bracket 130 is provided with a pin 131. A rear bracket 130 rotatably supports a shackle 140 with the pin 131 via a bush (not shown). By this structure, the shackle 140 is rotatably supported by the frame 2 via the rear bracket 130.

The shackle 140 is provided with a pin 141. The eye 112 of the leaf spring 110 is wrapped around the pin 141 via a bush (not shown). By this structure, the leaf spring 110 is rotatably supported by the frame 2 via the rear bracket 130 and the shackle 140. Expanding and contracting in the front-back direction of the leaf spring 110 caused by bending backward thereof are absorbed by tilting of the shackle 140.

An axle 3 (mounting member) extended in the width direction of the car 1 is fixed to a lower surface of an intermediate portion in a longitudinal direction of the leaf spring 110 by a U-shaped bolt 150. As shown in FIG. 1, a matched pair of wheels 4 are mounted to both ends in the longitudinal direction of the axle 3. Therefore, when the car 1 is moved or the frame 2 of the car 1 is lifted, the leaf spring 110 is bent backward and forward.

As shown in FIG. 2, a stay 160 (blocking means) which is arranged at a position between the intermediate portion of the leaf spring 110 and the rear end thereof is attached to the frame 2 of the car 1. The attaching position of the stay 160 in the front-rear direction of the car 1 is determined so as to prevent a portion to a rear of a breaking point of the leaf spring 110 from contacting the ground in a case in which the leaf spring 110 is broken at a position at a portion to a rear of the fixing position of the stay 160 and the portion to the rear of the breaking point of the leaf spring 110 is not engaged with the stay 160 and is hanged. The attaching position of the stay 160 is preferably close to the rear end of the leaf spring 110 since the stay 160 is applied with a load of the portion to the rear of the breaking point of the leaf spring 110 when the leaf spring 110 is broken at a portion to the rear of the intermediate portion.

Figure 3:
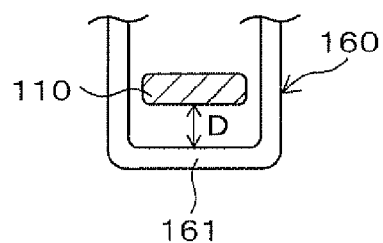
FIG. 3 is a cross sectional view taken along line III to III in FIG. 2.

As shown in FIG. 3, the stay 160 is formed in a U-shape in a plane view. The stay 160 is formed in a size in which the stay 160 and the leaf spring 110 are prevented from contacting each other by a distance D in a case of maximum deflection of the leaf spring 110. The stay 160 has an engaging portion 161 at the underside of the leaf spring 110. When the leaf spring 110 is broken at the portion to the rear of the intermediate portion, the portion to the rear of the breaking point thereof is engaged with the engaging portion 161.

Figure 5:
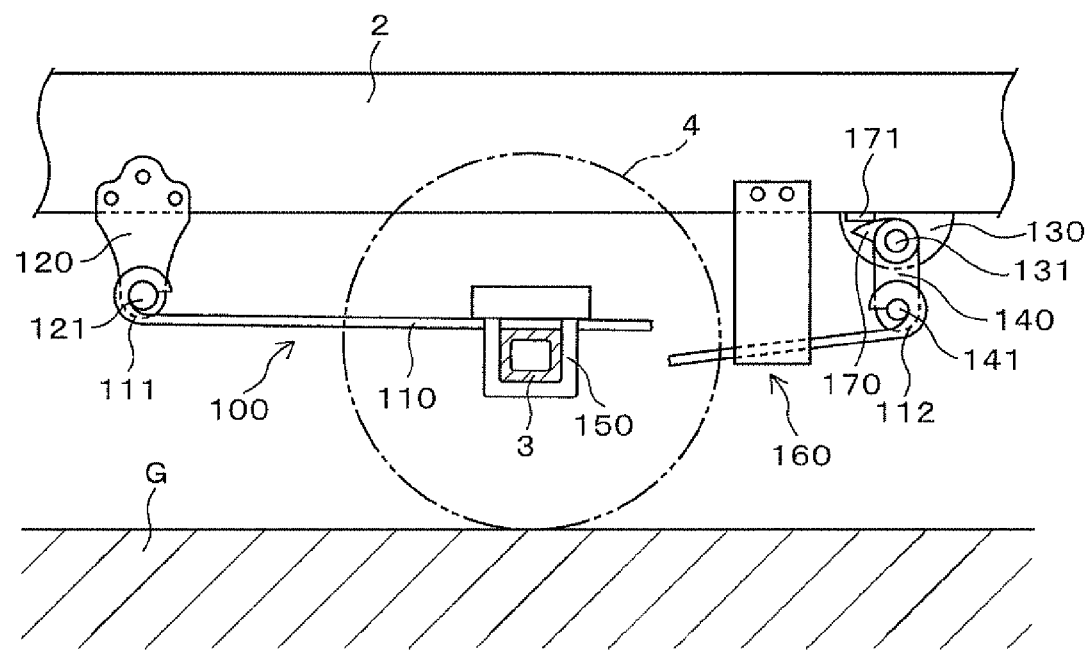
FIGS. 5 is a view showing a condition in which a leaf spring is broken.

As shown in FIG. 5, when the leaf spring 110 is broken at the portion to the rear of the intermediate portion, the portion to the rear of the breaking point is engaged with the engaging portion 161, the stay 160 blocks a counterclockwise rotation of the portion to the rear of the breaking point of the leaf spring 110 in such a way that the portion to the rear of the breaking point thereof is engaged with the stay 160 and is supported thereby. Therefore, the portion to the rear of the breaking point of the leaf spring 110 is prevented from hanging and the portion to the rear of the breaking point thereof is prevented from contacting the ground G.

Figure 4:
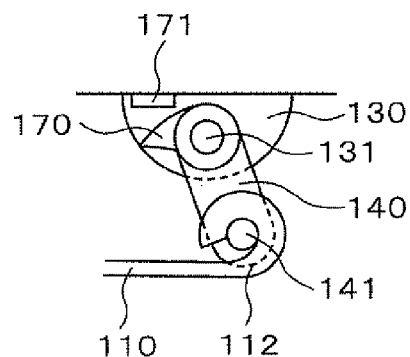
FIG. 4 is an enlarged view showing the section X in FIG. 2.

As shown in FIG. 4, a stopper 170 is provided to the shackle 140. As shown in FIG. 5, the stopper 170 contacts a cushion member 171 attached to the flame 2 for blocking forward tilting of the shackle 140 at an angle greater than a predetermined angle. By this structure, a condition in which the portion to the rear of the breaking point of the leaf spring 110 is supported by the stay 160 can be prevented from being canceled. Therefore, the portion to the rear of the breaking point of the leaf spring 110 is prevented from hanging from the portion in which the leaf spring 110 is rotatably supported by the shackle 140 and the portion to the rear of the breaking point thereof is prevented from contacting the ground G.

According to the angle of the shackle 140, function of the shackle 140 is not deteriorated and supporting condition of the portion to the rear of the breaking point of the leaf spring 110 by the stay 160 can be prevented from being canceled in a case of the breakage of the leaf spring 110 at the portion to the rear of the intermediate portion. The predetermined angle is changed according to each employed suspension apparatus 100 and is set according to, for example, the attaching position and a size of the stay 160 or those of the shackle 140.

In the first embodiment, when the leaf spring 110 is broken at the portion to the rear of the intermediate portion, the portion to the rear of the breaking point of the leaf spring 110 is blocked to rotate, so that the portion to the rear of the breaking point is prevented from hanging and the portion to the rear of the breaking point is prevented from contacting the ground G. Therefore, the car 1 is prevented from being partially lifted, so that the wheel 4 can be prevented from moving away from the ground G. Therefore, safety of the car 1 can be improved.

First Modification of Stay

Figure 6A:
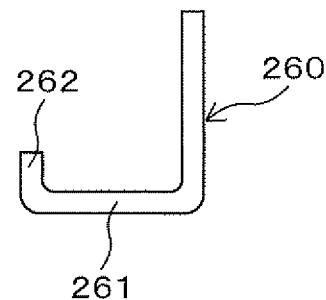
FIGS. 6A to 6D are views showing modifications of a stay.
Figure 6B:
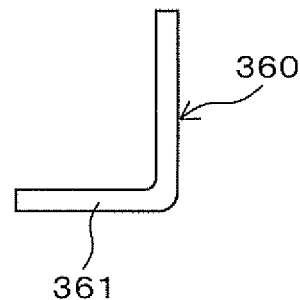

FIG. 6A is a view showing a modification of the stay 160. A stay 260 is shown in FIG. 6A. The stay 260 is formed substantially in an L-shape in plane view. The stay 260 has an engaging portion 261. A projection portion 262 is formed at an end of the engaging portion 261 so that a condition in which the leaf spring 110 is engaged with the engaging portion 261 is not cancelled, Second Modification of Stay FIG. 6B is a view showing a modification of the stay 160. A stay 360 is shown in FIG. 6B. The stay 360 is formed in an L-shape in plane view. The stay 360 has an engaging portion 361. In contrast to FIG. 6A, the projection portion is not formed at a front end of an engaging portion 361. Weight reduction can be fulfilled by the stay 360.

Third Modification of Stay

Figure 6C:
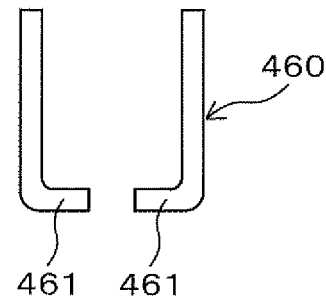

FIG. 6C is a view showing a modification of the stay 160. A stay 460 is shown in Fig, 6C. The stay 460 is formed in a shape in which L-shaped members face each other in plane view. The stay 460 has an engaging portion 461 in which a gap is formed at the center portion thereof. Weight reduction can be obtained by the stay 460.

Fourth Modification of Stay

Figure 6D:
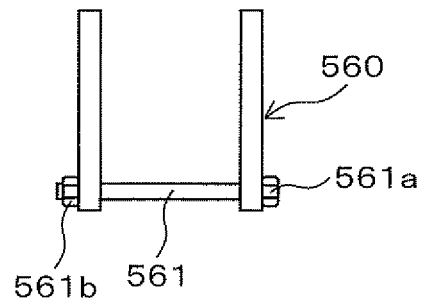

FIG. 6D is a view showing a modification of the stay 160. A stay 560 is shown in FIG. 6D. The stay 560 is formed in a U-shape in plane view. The stay 560 has an engaging portion 561 composed of a bolt 561a and a nut 561b. Attachment and removal of the leaf spring 110 and those of the stay 560 are relatively easy, since the stay 560 has this structure.

First Modification of Stopper

Figure 7A:
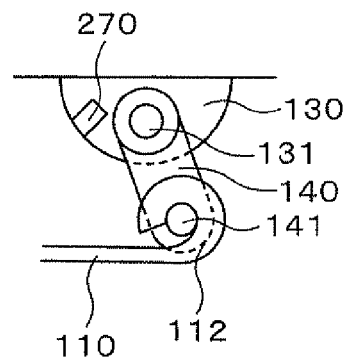
FIGS. 7A and 7B are views showing modifications of a stopper.

FIG. 7A is a view showing a modification of the stopper 170. A stopper 270 is shown in FIG. 7A. The stopper 270 is attached to the rear bracket 130. The stopper 270 blocks forward tilting of the shackle 140 at an angle greater than a predetermined angle by contacting the shackle 140.

Second Modification of Stopper

Figure 7B:
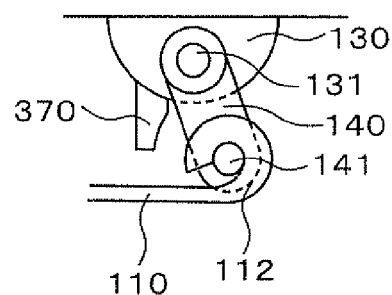

FIG. 7B is a view showing a modification of the stopper 170. A stopper 370 is shown in FIG. 7B. The stopper 370 is attached to the rear bracket 130. The stopper 370 blocks forward tilting of the shackle 140 at an angle greater than the predetermined angle by contacting the eye 112 of the leaf spring 110. The stopper 370 may be attached not only to the rear bracket 130 but also to the frame 2 of the car 1.

Other Modifications

As an example of other modifications, the stay 160 may be formed using a cord or a chain. Furthermore, the stay 160 may be attached not only to the frame 2 of the car 1, but also to the rear bracket 130. Two leaf springs 110 are provided in the front side of the intermediate portion and one leaf spring 110 is provided in the portion to the rear of the intermediate portion.

2. Second Embodiment

Next, a second embodiment is explained with reference to the FIGS. 8 to 10 hereinafter. In the second embodiment, the stay 160 and the stopper 170 in the first embodiment are modified. Therefore, components of modified structures are mainly explained and explanation for the same component is omitted.

Figure 8:
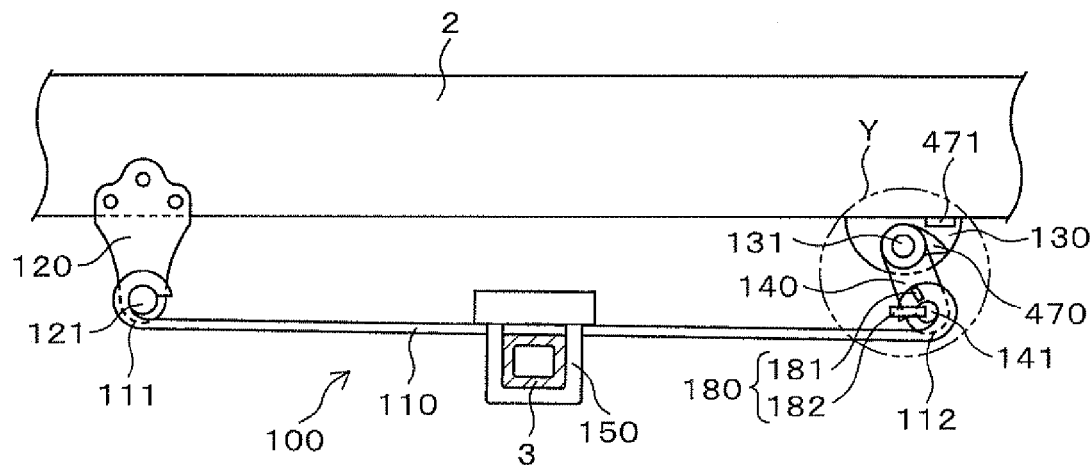
FIG. 8 is a view showing a schematic structure of a suspension apparatus of a second embodiment of the present invention.

As shown in FIG. 8, the suspension apparatus 100 is provided with a blocking mechanism 180 (the blocking means) and a stopper 470 arranged at a rear end side of the leaf spring 110. As shown in FIG. 9, the blocking mechanism 180 is provided with an engaging member 181 and a stopping member 182.

The engaging member 181 is fixed to the eye 112 of rear end of the leaf spring 110. The engaging member 181 is moved and engaged with the stopping member 182 by rotation of the eye 112 when the leaf spring 110 is broken at the portion to the rear of the intermediate portion thereof. The stopping member 182 is fixed to a pin 141 of a shackle 140. The stopping member 182 stops the engaging member 181 when the leaf spring 110 is broken at the portion to the rear of the intermediate portion.

The engaging member 181 and the stopping member 182 are attached to positions in which the engaging member 181 and the stopping member 182 do not contact each other in case of maximum deflection of the leaf spring 110 and the engaging member 181 and the stopping member 182 contact each other before the portion to the rear of the breaking point contacts the ground G.

Figure 10:
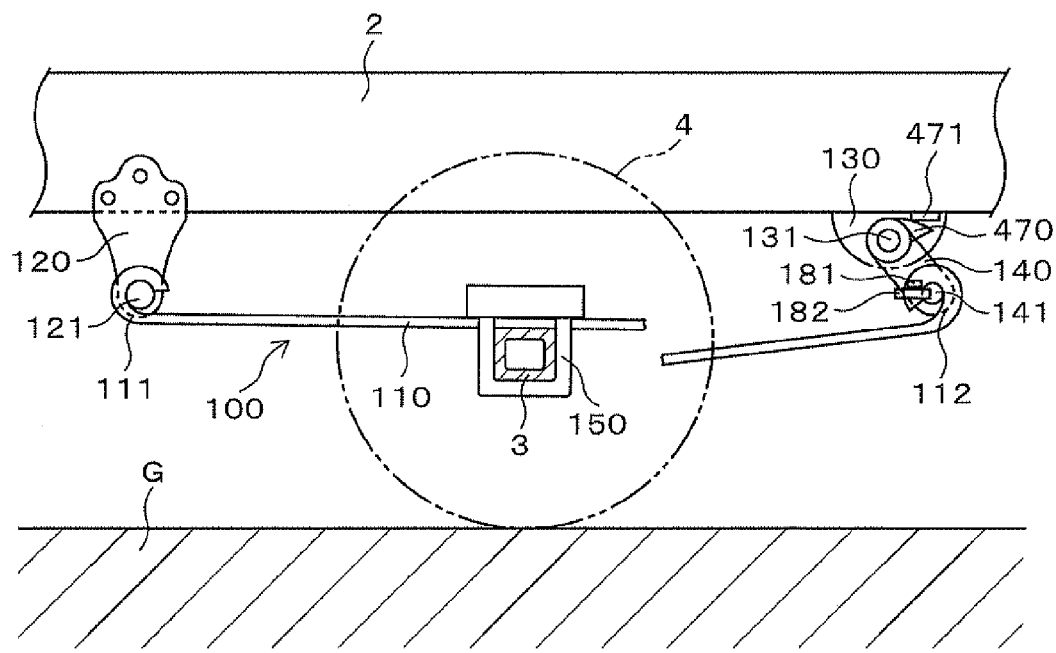
FIG. 10 is a view showing a condition in which the leaf spring is broken.

As shown FIG. 10, when the leaf spring 110 is broken at the portion to the rear of the intermediate portion, the stopping member 182 stops the engaging member 181and the blocking mechanism 180 blocks rotation of the portion to the rear of the breaking point of the leaf spring 110. Therefore, the portion to the rear of the breaking point of the leaf spring 110 is prevented from hanging and the portion to the rear of the breaking point is prevented from contacting the ground G.

Figure 9:
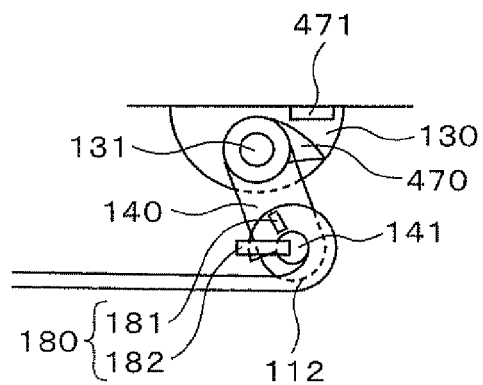
FIGS. 9 is an enlarged view showing the section Y in FIG. 8.

As shown in FIG. 9, a stopper 470 is provided to the shackle 140. As shown in FIG. 10, the stopper 470 contacts a cushion 471 mounted to the frame 2, so that the shackle 140 is blocked to tilt rearward at an angle greater than the predetermined angle. Therefore, the shackle 140 does not tilt rearward by the weight of the leaf spring 110 in a condition in which the portion to the rear of the breaking point of the leaf spring 110 is blocked to rotate by the blocking mechanism 180, so that the portion to the rear of the breaking point is prevented from contacting the ground G.

According to the angle, function of the shackle 140 is not deteriorated and the breaking point does not contact the ground G in a condition in which the rotation of the portion to the rear of the breaking point of the leaf spring 110 is clocked by the blocking mechanism 180 when the leaf spring is broken at the portion to the rear of the intermediate portion. The predetermined angle is varied according to various suspension apparatus 100 to which it is applied. For example, the predetermined angle is set according to a shape of the leaf spring 110 and a weight thereof or the attaching position of the shackle 140 and size thereof.

In the second embodiment, when the leaf spring 110 is broken at the portion to the rear of the intermediate portion, the portion to the rear of the breaking point is blocked to rotate, so that the portion to the rear of the breaking point is prevented from hanging and the portion to the rear of the breaking point is prevented from contacting the ground G. Therefore, the car 1 is not partially lifted, so that the wheel 4 is prevented from moving away from the ground G. Therefore, safety of the car 1 can be improved.

3. Other Modifications Next, other modifications are explained. The stay 160 and the blocking mechanism 180 may be provided. Furthermore, the stay 160, the blocking mechanism 180 and the stoppers 170 and 470 may be provided. In these cases, the portion to the rear of the breaking point of the leaf spring 110 does not contact the ground G and the wheel 4 is prevented from losing contact the ground G, so that safety of the car 1 can be improved.

The present invention can be applied to suspension apparatuses of cars.

Explanation Of Reference Numerals

Reference numerals 1 denotes a car, 2 denotes a frame, 3 denotes an axle, 4 denotes wheel, 100 denotes a suspension apparatus, 110 denotes a leaf spring, 111 and 112 denote an eye, 120 denotes a front bracket, 121 and 131 denote a pin, 130 denotes a rear bracket, 140 denotes a shackle, 150 denotes an U-shaped bolt, 160 denotes a stay, 161 denotes an engaging portion, 170 denotes a stopper, 171 denotes a cushion member, 180 denotes a blocking mechanism, 181 denotes a engaging member and 182 denotes a stopping member.

What is claimed is:

1. A suspension apparatus comprising:
    a leaf spring in which a front end and a rear end are rotatably supported by a frame of a car and an intermediate portion in a longitudinal direction is attached to an attaching member for a wheel, wherein only one leaf spring is equipped in the apparatus, and is supported by the frame such that a portion to a rear of a breaking point of the leaf spring can rotate and contact the ground in a case of the breakage of the leaf spring at a portion to a rear of the intermediate portion; and
    a blocking means for blocking rotation of the portion to the rear of the breaking point of the leaf spring only when the leaf spring is broken at the portion to the rear of the intermediate portion,
        wherein the blocking means is a stay in which the portion to the rear of the breaking point of the leaf spring rotates and comes into contact with the stay in a case of the breakage of the leaf spring at the portion to the rear of the intermediate portion, and
        wherein the stay is supported by the frame so as not to rotate
    wherein the stay is spaced a predetermined distance from the leaf spring before breakage of the leaf spring, wherein the predetermined distance is greater than a maximum deflection of the leaf spring so that the leaf spring and the stay do not come into contact with each other unless the leaf spring is broken at the portion to the rear of the intermediate portion.

2. The suspension apparatus according to claim 1, wherein the apparatus further comprising:
    an eye formed at the rear end of the leaf spring; and
    a pin to which the eye is wound around is hanged in an inclinable condition; wherein the blocking means is provided with an engaging member fixed to the eye and a stopping member fixed to the pin, and
    the stopping member stops the engaging member moved by rotation of the eye in the case of the breakage of the leaf spring at the portion to the rear of the intermediate portion.

3. The suspension apparatus according to claim 2, wherein the apparatus further comprising:
    a shackle rotatably supported by the frame and rotatably supporting the rear end of the leaf spring;
    a stopper for blocking tilting of the shackle at an angle greater than a predetermined angle toward the portion to the rear of the car.

4. The suspension apparatus according to claim 1, wherein the apparatus further comprising:
    a shackle rotatably supported by the frame and rotatably supporting the rear end of the leaf spring;
    a stopper for blocking tilting of the shackle at an angle greater than a predetermined angle toward the front side of the car.

5. The suspension apparatus according to claim 1, wherein the stay supports only a lower surface of the leaf spring.

6. The suspension apparatus according to claim 1, wherein the stay is substantially L-shaped when viewed from a front of the car, and comprises a vertical portion supported by the frame and extending downwardly, and an engaging portion horizontally extending from a lower end of the vertical portion for blocking rotation of a portion to the rear of the breaking point of the leaf spring in a case of the breakage of the leaf spring.

7. The suspension apparatus according to claim 6, wherein the engaging portion has a projection portion at an end thereof so that a condition in which the leaf spring is engaged with the engaging portion is not cancelled.

8. The suspension apparatus according to claim 1, wherein the stay comprises a pair of substantially L-shaped portions facing each other when viewed from a front of the car, the substantially L-shaped portions comprising a vertical portion supported by the frame and extending downwardly, and an engaging portion horizontally extending from a lower end of the vertical portion toward each other for blocking rotation of a portion to the rear of the breaking point of the leaf spring in a case of the breakage of the leaf spring.

9. The suspension apparatus according to claim 1, wherein the stay is substantially U-shaped when viewed from a front of the car, and comprises a pair of vertical portions supported by the frame and extending downwardly, a screw member penetrating an end portion of the vertical portions, a nut attached to the screw member, and an engaging portion for blocking rotation of a portion to the rear of the breaking point of the leaf spring in a case of the breakage of the leaf spring.

* * * * *